(12) United States Patent
Hara et al.

(10) Patent No.: US 6,932,177 B2
(45) Date of Patent: Aug. 23, 2005

(54) LAYOUT STRUCTURE OF THE FUEL PUMP OF A MOTORCYCLE

(75) Inventors: Ikuo Hara, Wako (JP); Kenta Nakamura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 10/799,465

(22) Filed: Mar. 12, 2004

(65) Prior Publication Data

US 2004/0200652 A1 Oct. 14, 2004

(30) Foreign Application Priority Data

Mar. 20, 2003 (JP) ........................................ 2003-078345

(51) Int. Cl.⁷ ............................................... B62J 35/00
(52) U.S. Cl. ....................... 180/219; 180/69.4; 123/509
(58) Field of Search ................................ 180/219, 225; 123/509, 69.4

(56) References Cited

U.S. PATENT DOCUMENTS 4,469,190 A * 9/1984 Yamaguchi ................. 180/219
5,599,253 A * 2/1997 Ishibashi et al. ............ 477/111
6,626,155 B1 * 9/2003 Ueda et al. .................. 123/509

FOREIGN PATENT DOCUMENTS

JP          2000-297711     10/2000
JP          2002-106440      4/2002

* cited by examiner

*Primary Examiner*—Kevin Hurley
(74) *Attorney, Agent, or Firm*—Hamre, Schumann, Mueller & Larson, P.C.

(57) ABSTRACT

In a motorcycle in which a rear wheel is suspended by a rear-wheel suspending part provided of a body frame, a fuel tank is attached in an upper portion of the body frame, an engine is attached in a lower portion of the body frame, a fuel injection valve is provided on the intake side of the engine, and fuel in the fuel tank is supplied to the fuel injection valve by a fuel pump, the fuel pump is attached to the body frame near the rear wheel suspending part. The degree of freedom of layout of the fuel pump can be increased and the fuel pump can be disposed in a position far from the engine, so that thermal effects of the engine onto the fuel pump can be suppressed.

5 Claims, 6 Drawing Sheets

LAYOUT STRUCTURE OF THE FUEL PUMP OF A MOTORCYCLE

FIELD OF THE INVENTION

The present invention relates to a layout structure of a fuel pump of a motorcycle.

BACKGROUND OF THE INVENTION

As layout structures of a fuel pump of a motorcycle, Japanese unexamined patent publication No. 2000-297711 discloses a structure in which a fuel pump is disposed near an engine. Japanese unexamined patent publication No. 2002-106440 discloses a structure in which a fuel pump is disposed in a fuel tank The structure disclosed by publication No. 2000-297711 will be described with reference to FIG. 5 and the structure disclosed by publication No. 2002-106440 will be described with reference to FIG. 6.

FIG. 5 is a cross section showing a conventional layout structure of a fuel pump of a motorcycle and illustrates that a fuel case 103 in which a fuel pump is housed is disposed above an engine 101 and below a fuel tank 102. The layout includes a throttle body 105, and a fuel injection valve 106 attached to the throttle body 105. The fuel case 103 is shown not in a cross section but in a side view for convenience. The fuel case 103 for housing the fuel pump is disposed near the engine 101, so that the fuel case 103 is easily heat-affected. When the fuel case 103 is disposed near the fuel tank 102, the degree of freedom of connection between the fuel case 103 and the fuel tank 102 decreases, and a processed shape of a bottom wall of the fuel tank 102 becomes complicated.

FIG. 6 is a cross section showing another conventional layout structure of a fuel pump of a motorcycle. A mounting flange 112 is attached to an inner surface of a fuel tank 111. A center portion of the mounting flange 112 is covered with a base plate 113, a strainer 114 is attached to the base plate 113, a fuel pump 115 is coupled to the strainer 114, and a fuel filter 116 is connected to the fuel pump 115. When the fuel pump 115 is attached in the fuel tank 111, the degree of freedom of attachment of the fuel pump 115 is limited by the shape of the fuel tank 111. Particularly, in an American-type vehicle having the flat fuel tank 121 shown in FIG. 7, the shape and dimensions of the fuel pump apparatus 123 are also limited.

FIG. 7 shows a layout structure of a fuel pump in an American-type motorcycle. FIG. 7 is a partly-sectional side view showing a conventional layout structure of a fuel pump of a motorcycle. A fuel tank 121 of an American-type motorcycle (a vehicle called a "custom vehicle") has a thin and flat shape having a large dimension in the longitudinal direction and a small dimension in the vertical direction (so-called a teardrop (water drop) shape). FIG. 7 shows that a fuel pump apparatus 123 which includes a strainer, a pump body, and a motor and is long in the longitudinal direction is attached to an inner wall 122 of the fuel tank 121.

An object of the invention is, therefore, to improve a layout structure of a fuel pump of a motorcycle, thereby increasing resistance to thermal effects of an engine, facilitating connection to a fuel tank, and increasing the degree of freedom of layout for a vehicle body.

SUMMARY OF THE INVENTION

To achieve the object, a layout structure of a fuel pump of in a motorcycle comprising a front wheel suspended in a front portion of a body frame, a rear wheel suspended by a rear-wheel suspending part provided in a rear portion of the body frame, a fuel tank attached in an upper portion of the body frame, an engine attached in a lower portion of the body frame, a fuel injection valve provided on an intake side of the engine, and fuel in the fuel tank supplied to the fuel injection valve by a fuel pump, wherein the fuel pump is attached to the body frame near the rear wheel suspending part.

By attaching the fuel pump to the body frame near the rear-wheel suspending part, the degree of freedom of layout of the fuel pump can be increased and the fuel pump can be disposed in a position far from the engine, so that thermal effects of the engine onto the fuel pump can be suppressed. Further, since it is sufficient to attach a pipe for connecting a fuel pipe to the fuel tank, processing of the fuel tank can be suppressed to the minimum. Further, as compared with the case where the fuel pump is disposed in the fuel tank, in the invention, the degree of freedom of designing of the fuel pump can be increased. Moreover, by attaching the fuel pump to the body frame near the rear-wheel suspending part, the fuel pump can be protected by the surrounding body frame.

Further, the fuel pump may be disposed in a fuel case. The fuel pump can be protected by the fuel case more reliably. For example, the fuel pump can be protected from being hit by flying gravel or the like.

DETAILED DESCRIPTION OF THE INVENTION

Figure 1:
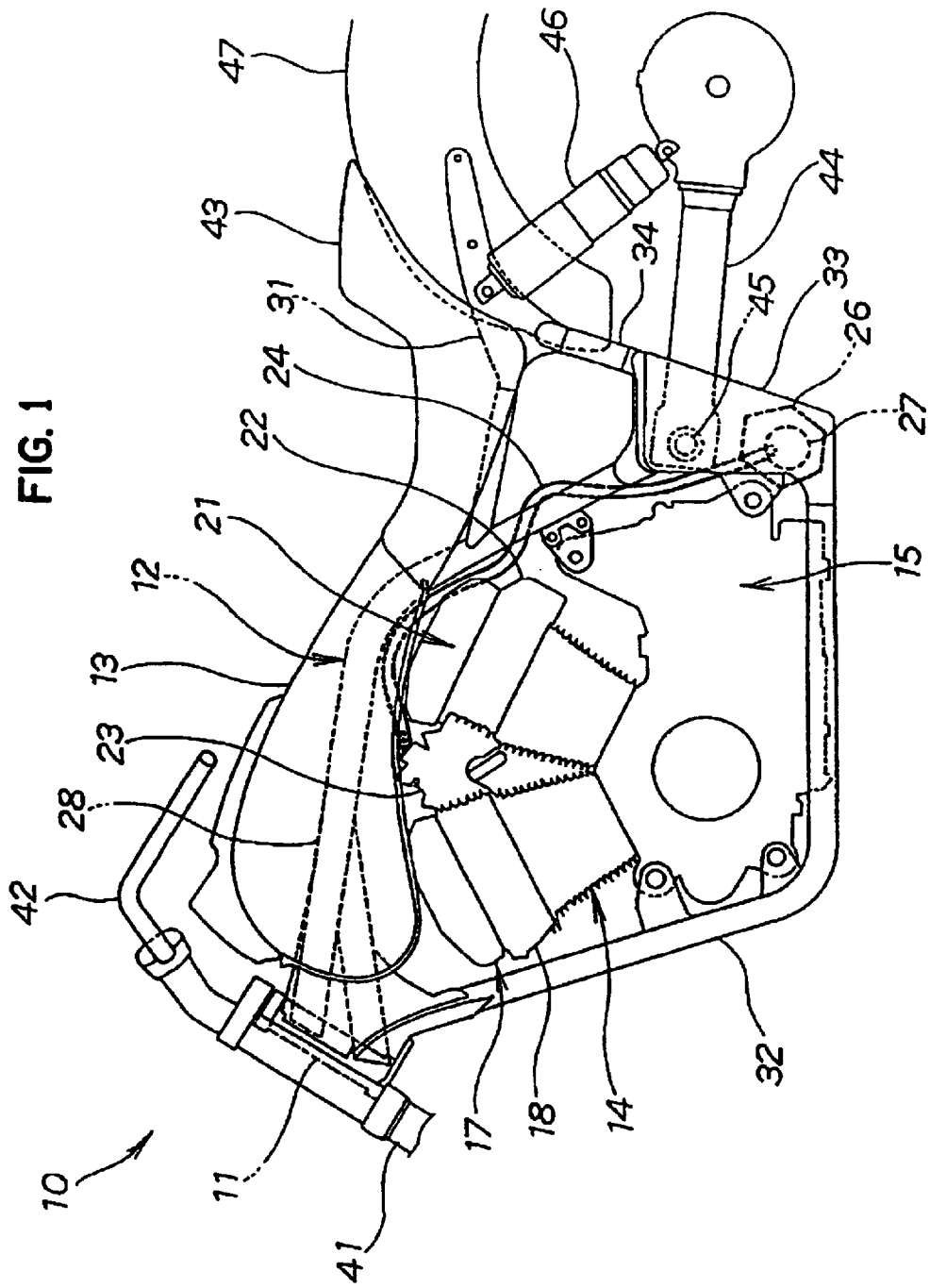
FIG. 1 is a side view of a motorcycle employing a fuel pump layout structure according to the invention.

An embodiment of the present invention will be described herein below with reference to the attached drawings. The drawings are to be seen from the direction of reference numerals.

FIG. 1 is a side view of a motorcycle employing a fuel pump layout structure according to the invention. A motorcycle 10 is a vehicle in which a body frame 12 extends rearward from a head pipe 11, a fuel tank 13 is attached on the body frame 12, a V-shaped 2-cylinder engine 14 and a transmission 15 provided integrally with the engine 14 are attached on the inner side of the body frame 12, a throttle body 23 is provided between a front-side cylinder 17 (specifically, a front-side cylinder head 18) and a rear-side cylinder 21 (specifically, a rear-side cylinder head 22) of the engine 14, a fuel pump 27 in a sub tank 26 as a fuel case is connected to the throttle body 23 via a high-pressure pipe 24, and the fuel tank 13 is connected to the sub tank 26 via a not-shown fuel pipe.

The body frame 12 is constructed by a main pipe 28 extended rearward from the head pipe 11 and extended obliquely downward to the rear side, a seat rail 31 extended rearward from some midpoint of the main pipe 28, a down pipe 32 extended obliquely downward to the rear side from the head pipe 11 and extended rearward, a rear-wheel suspending part 33 for coupling a tip of the main pipe 28 and a tip of the down pipe 32, and a sub pipe 34 extended from the rear-wheel suspending part 33 to the seat rail 31.

The sub tank 26 is a part disposed on the inside of the rear-wheel suspending part 33 and housing therein a fuel pump which will be described later.

A front fork 41 is steerably attached to the head pipe 11 and to whose lower end a front wheel is attached. A handle 42 is attached to the top portion of the front fork 41. Also shown are a seat 43, a swing arm 44 housing a drive shaft for transmitting power from the transmission 15 to the rear wheel and to whose rear end the rear wheel is attached, a swing shaft 45 of the swing arm 44, a rear cushion unit 46 extended between the rear portion of the swing arm 44 and the seat rail 31, and a rear fender 47 covering an upper portion of the rear wheel.

Figure 2:
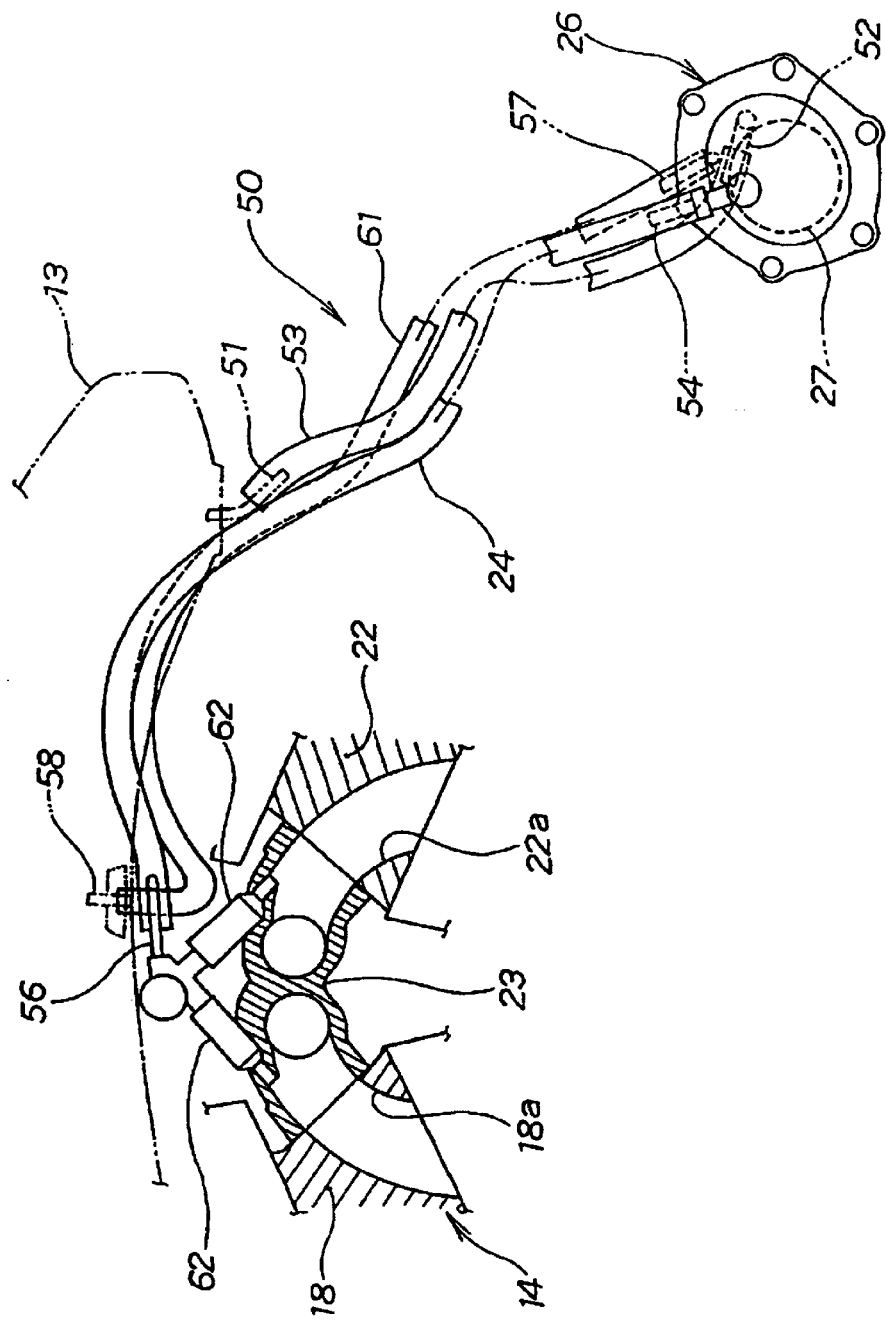
FIG. 2 is a diagram illustrating piping of the fuel pump layout structure according to the invention.

FIG. 2 is a diagram illustrating piping of the fuel pump layout structure according to the invention. Fuel supply equipment 50 for supplying fuel from the fuel tank 13 to the engine 14 includes the fuel tank 13, a supply pipe 53 connected from a discharge pipe 51 provided in a rear lower part of the fuel tank 31 to a suction pipe 52 of the sub tank 26, the high-pressure pipe 24 connected from a high-pressure discharge pipe 54 provided for the sub tank 26 to a distribution pipe 56 on the throttle body 23 side, a return pipe 61 connected from a return discharge pipe 57 provided for the sub tank 26 to a return intake pipe 58 provided in a lower portion of an almost center portion of the fuel tank 13, and fuel injection valves 62 and 62 connected to the distribution pipe 56 and also attached to the throttle body 23.

The supply pipe 53 is a pipe for supplying fuel from the fuel tank 31 to the sub tank 26. The high-pressure pipe 24 is a pipe for supplying fuel of which pressure is increased to a predetermined pressure from the fuel pump 27 in the sub tank 26 to the fuel injection valves 62 and 62 via the distribution pipe 56. The return pipe 61 is a pipe for returning the fuel in the sub tank 26 to the fuel tank 13 by the action of a not-shown pressure adjusting valve when the pressure of supply fuel is high in order to supply fuel of predetermined pressure to the fuel injection valve 62. The fuel injection valve 62 is a valve which is intermittently opened/closed in accordance with a signal from a not-shown engine control unit to thereby inject the fuel to intake ports 18*a* and 22*a* of the engine 14.

Figure 3:
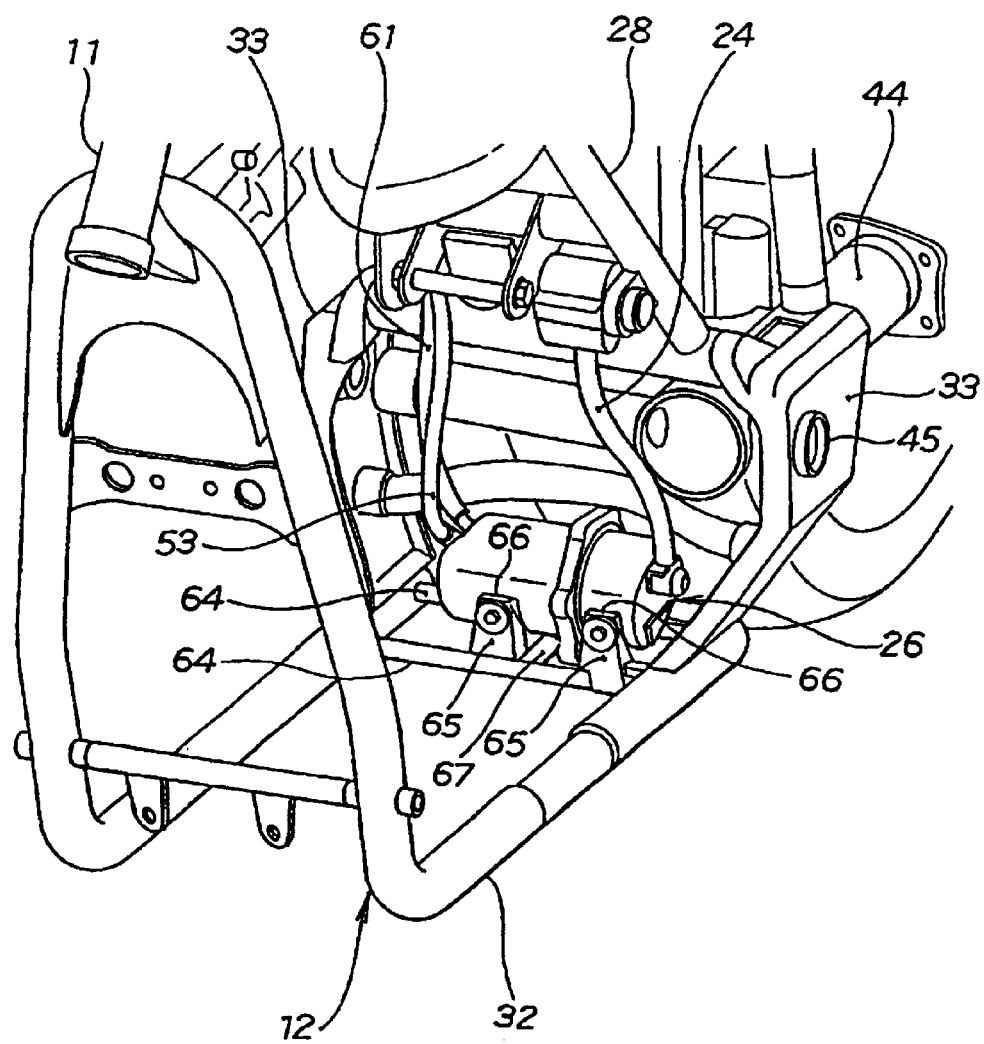
FIG. 3 is a perspective view showing the fuel pump layout structure according to the invention.

FIG. 3 is a perspective view showing the fuel pump layout structure according to the invention, in which two cross members 64 and 64 are extended in parallel with each other in the longitudinal direction in a rear end portion of the down pipe 32 in the body frame 12, three sub tank brackets 65 (out of which two sub tank brackets 65 on the front side are shown) are attached to the cross members 64 and 64, and the sub tank 26. Mounting parts 66 provided for the sub tank 26 are attached to the sub tank brackets 65. A beam 67 extends in a center portion of each of the front and rear cross members 64 and 64.

Since sides of the body are covered with the plate-shaped rear-wheel suspending parts 33 and 33 as components of the body frame 12 and the cross members 64 and 64 and the beam 67 are disposed below the sub tank 26, the sub tank 26 can be protected with reliability by the rear-wheel suspending parts 33 and 33, the cross members 64 and 64, and the beam 67. Further, since the fuel pump 27 (refer to FIG. 1) is housed in the sub tank 26, the fuel pump 27 is protected more reliably.

A space on the inside of the rear-wheel suspending parts 33 and 33 exists below the swing shaft 45 of the swing arm 44 and is relatively large. In the invention, by disposing the sub tank 26 in such a space, the space on the inside of the body frame 12 can be effectively used.

Figure 4:
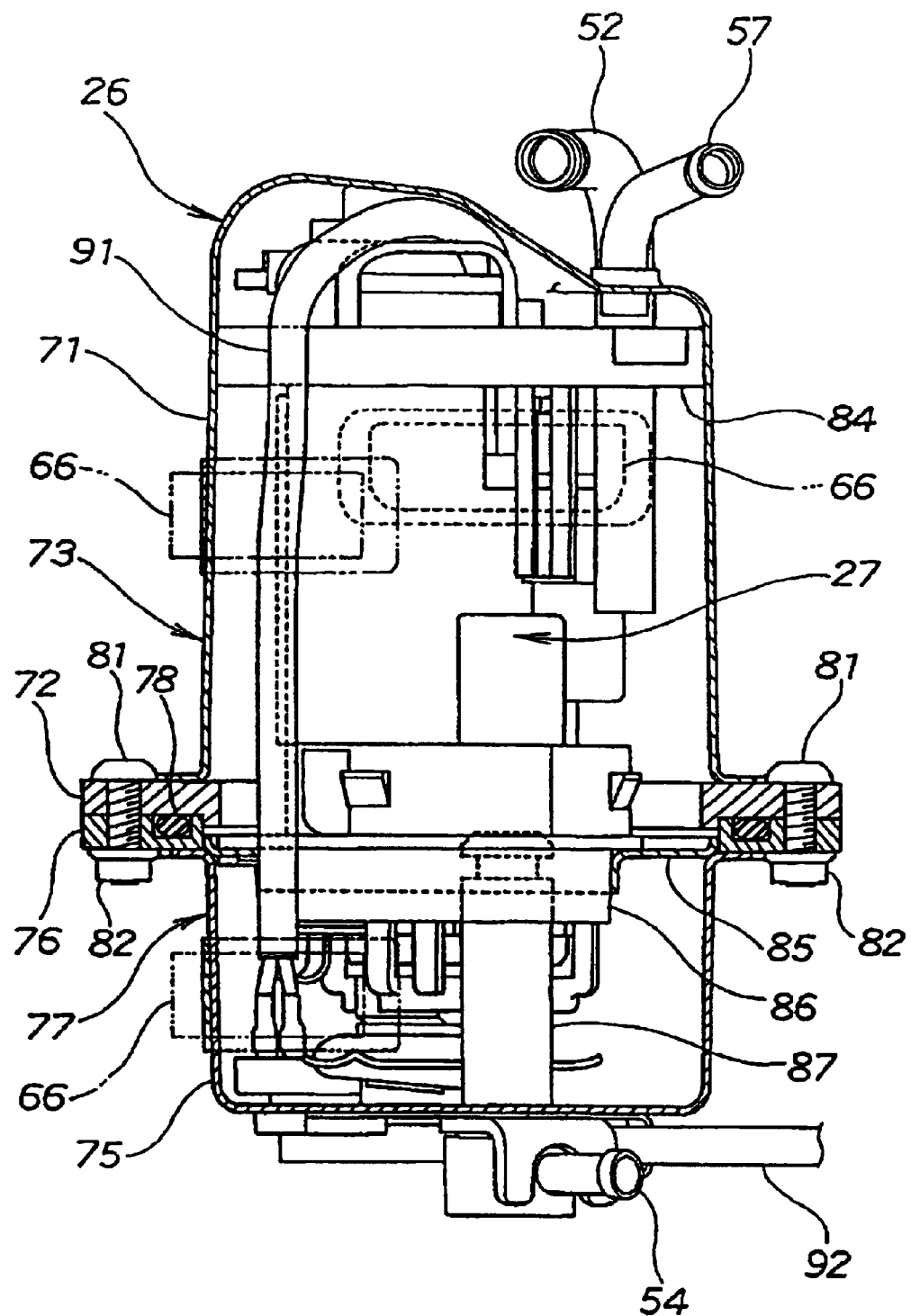
FIG. 4 is a cross section of a sub tank according to the invention.
Figure 5:
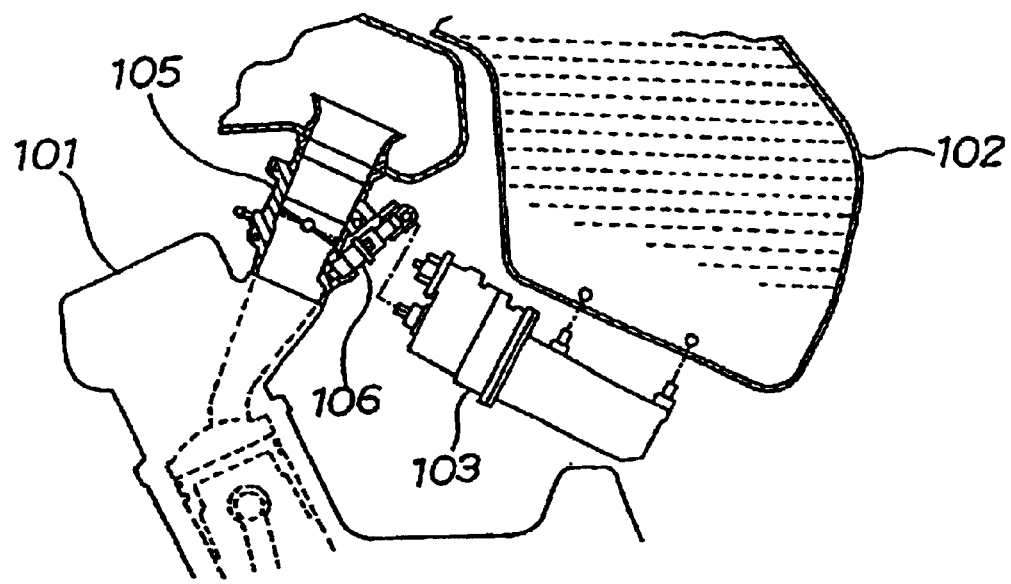
FIG. 5 is a cross section showing a conventional fuel pump layout structure of a motorcycle.
Figure 6:
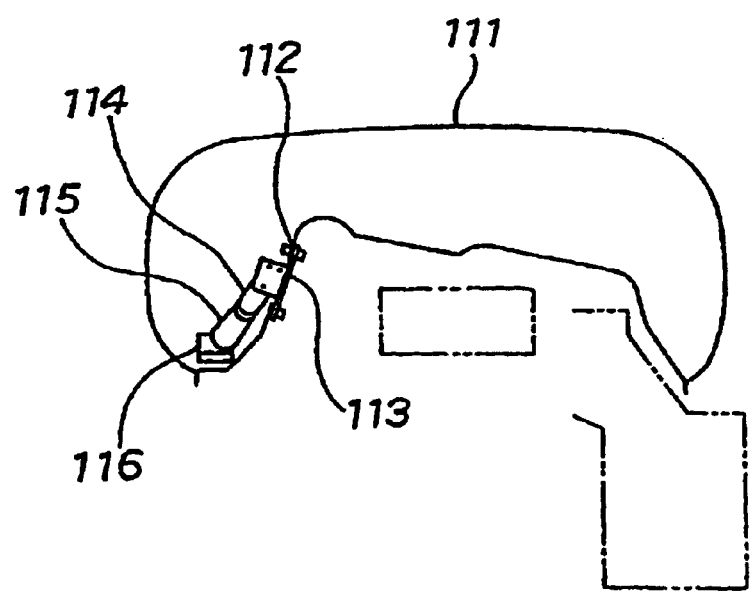
FIG. 6 is a cross section showing a conventional fuel pump layout structure of a motorcycle.
Figure 7:
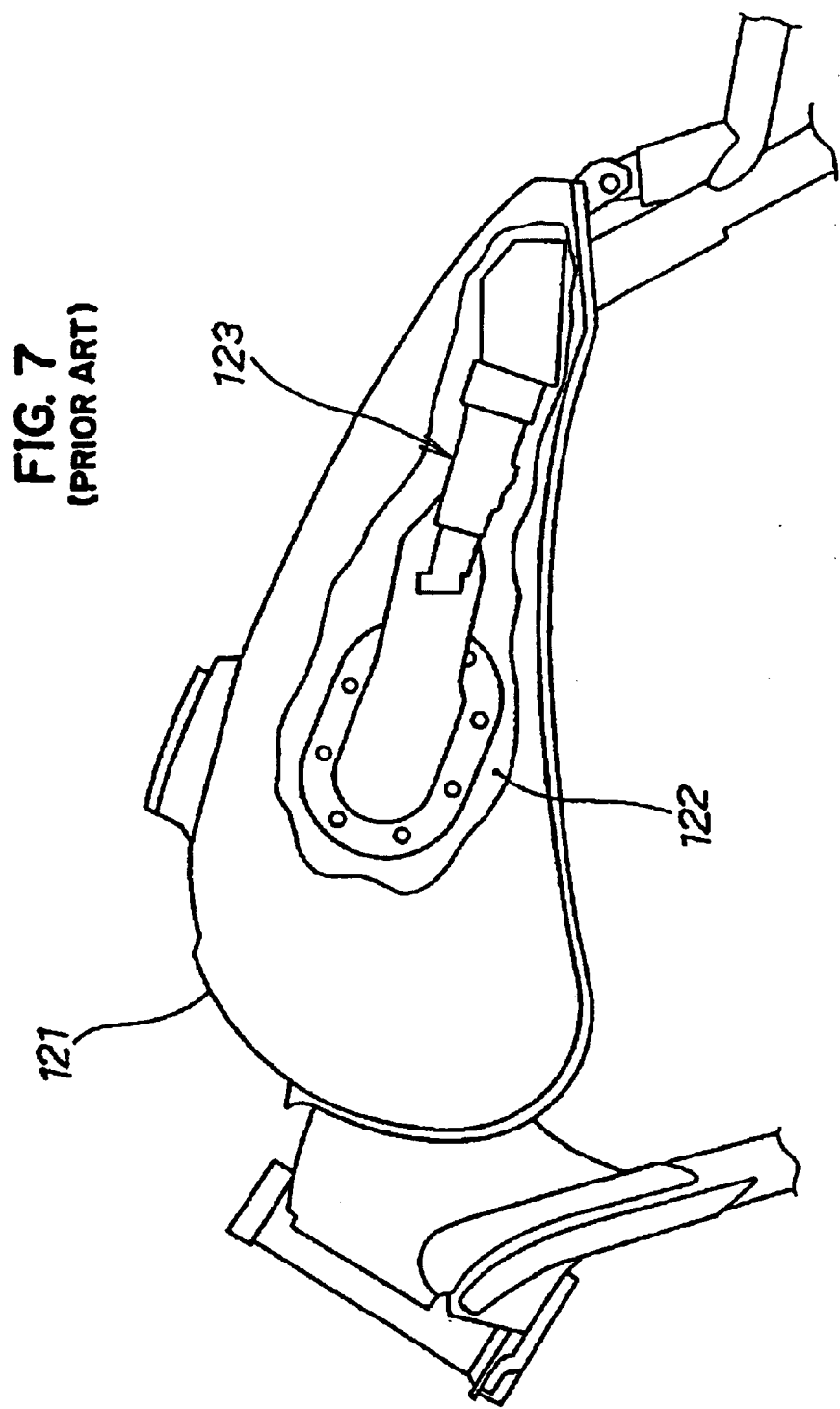
FIG. 7 is a side view showing a conventional fuel pump layout structure of a motorcycle.

FIG. 4 is a cross section of the sub tank 26 according to the invention. The sub tank 26 is constructed by: a first case half-body 73 made by a first cup member 71 having a bottomed cylindrical shape and a first flange member 72 of which outer shape attached to an opening of the first cup member 71 is an almost ellipse shape and is annular, a second case half-body 77 made by a second cup member 75 having a bottomed cylindrical shape and a second flange member 76 of which outer shape attached to an opening of the second cup member 75 is an almost ellipse shape and is annular, and an O ring 78 which is fit in the second flange member 76 to thereby seal the first and second flange members 72 and 76. The first and second case half-bodies 73 and 77 are coupled to each other via bolts 81 and nuts 82.

The suction pipe 52 and the return discharge pipe 57 are members attached to an end of the first cup member 71, and the tip of the suction pipe 52 is inserted in the first cup member 71 more deeply than that of the return discharge pipe 57.

The fuel pump 27 is supported by the first case half-body 73 via a supporting rubber 84, supported by the second case half-body 77 via an annular plate 85 and a supporting rubber 86 provided on the inside of the annular plate 85, and connected to the high-pressure discharge pipe 54 via a discharge-side coupling pipe 87. Also shown are a conductor 91 on the inside of the case and a conductor 92 on the outside of the case for energization in order to drive the fuel pump 27.

As described with reference to FIGS. 1, 2, and 3, the invention is characterized in that, in the motorcycle 10 in which the front wheel is suspended on the front side of the body frame 12, the rear wheel is suspended by the rear-wheel suspending part 33 provided in a rear portion of the body frame 12, the fuel tank 13 is attached in an upper portion of the body frame 12, the engine 14 is attached in a lower portion of the body frame 12, the fuel injection valve 62 is provided on the intake side of the engine 14, and fuel in the fuel tank 13 is supplied to the fuel injection valve 62 by the fuel pump 27, the fuel pump 27 is attached to the body frame 12 near the rear wheel suspending part 33, specifically, the cross members 64 and 64 attached to the down pipe 32.

By attaching the fuel pump 27 to the body frame 12 near the rear-wheel suspending part 33, the degree of freedom of layout of the fuel pump 27 can be increased and the fuel pump 27 can be disposed in a position far from the engine 14, so that thermal effects of the engine 14 onto the fuel pump 27 can be suppressed. Further, since it is sufficient to attach pipes (the discharge pipe 51 and the return intake pipe 58) for connecting fuel pipes (the supply pipe 53 and the return pipe 61) to the fuel tank 13, processing of the fuel tank 13 can be suppressed to the minimum. Further, as compared with the case where the fuel pump 27 is disposed in the fuel tank 13, in the invention, the degree of freedom of designing of the fuel pump 27 can be increased.

Moreover, by attaching the fuel pump 27 to the body frame 12 near the rear-wheel suspending part 33, the sub tank 26 housing the fuel pump 27 can be protected by the surrounding body frame 12, specifically, the rear-wheel suspending parts 33 and 33, cross members 64 and 64, and beam 67. Therefore, a tank guard member for guarding the sub tank 26 becomes unnecessary and the cost can be reduced. Further, the fuel pump 27 can be protected by the sub tank 26 more reliably. For example, the fuel pump 27 can be protected from a hit of a flying gravel or the like.

In the layout structure of the fuel pump of the motorcycle of claim 1, the fuel pump is attached to the body frame near the rear-wheel suspending part. Thus, the degree of freedom of layout of the fuel pump can be increased and the fuel pump can be disposed in a position far from the engine, so that thermal affection of the engine onto the fuel pump can be suppressed.

Further, since it is sufficient to attach pipes for connecting fuel pipes to the fuel tank, processing of the fuel tank can be suppressed to the minimum. Further, as compared with the case where the fuel pump is disposed in the fuel tank, in the invention, the degree of freedom of designing of the fuel pump can be increased. Moreover, by attaching the fuel pump to the body frame near the rear-wheel suspending part, the fuel pump can be protected by the surrounding body frame.

In the layout structure of the fuel pump of the motorcycle of claim 2, the fuel pump is disposed in the fuel case. Consequently, the fuel pump can be protected by the fuel case more reliably. The fuel pump can be protected from being hit by flying gravel or the like.

Although the embodiments of the present invention has been described thus far, the engine control unit of the present invention is not limited to the example in the drawings described above, various modification may be made without departing the scope of the present invention, as a matter of course.

We claim:

1. A layout structure of a fuel pump of a motorcycle comprising a front wheel suspended on the front side of a body frame, a rear wheel suspended by a pair of rear-wheel suspending parts provided in a rear portion of the body frame, a fuel tank attached in an upper portion of the body frame, an engine attached in a lower portion of the body frame, a fuel injection valve provided on an intake side of the engine, and fuel in said fuel tank supplied to the fuel injection valve by a fuel pump, a rear swing arm swingably supported on and between the pair of rear wheel suspending parts wherein the fuel pump is disposed in a space defined between the pair of rear wheel suspending parts and below a swing shaft of the swing arm.

2. The layout structure of a fuel pump of a motorcycle according to claim 1, wherein said fuel pump is disposed in a fuel case.

3. The layout structure of a fuel pump of a motorcycle according to claim 2, wherein the fuel case is attached to said body frame near said rear wheel suspending part.

4. The layout structure of a fuel pump of a motorcycle according to claim 2 further comprising a cross member for mounting the fuel case wherein the cross member is attached to a rear end portion of a down pipe of the body frame.

5. The layout structure of a fuel pump of a motorcycle according to claim 4 comprising a plurality of cross members for mounting the fuel case extending in parallel with each other and a beam extending between the cross members.

* * * * *